United States Patent [19]

Ando et al.

[11] 4,272,586

[45] Jun. 9, 1981

[54] LAMINATED GLASS PRODUCT

[75] Inventors: Toshihiro Ando; Hiroshi Ohgi; Ikuji Kishi, all of Machida, Japan

[73] Assignee: Denki Kagaku Kogyo Kabushiki Kaisha, Tokyo, Japan

[21] Appl. No.: 8,105

[22] Filed: Jan. 31, 1979

[30] Foreign Application Priority Data

Feb. 23, 1978 [JP] Japan .................................. 53-20249
Feb. 23, 1978 [JP] Japan .................................. 53-20250
Apr. 28, 1978 [JP] Japan .................................. 53-50130

[51] Int. Cl.³ ........................ B32B 27/28; C08F 2/46
[52] U.S. Cl. .............................. 428/419; 204/159.13; 204/159.23; 204/159.24; 428/429; 428/441; 428/442; 428/447
[58] Field of Search ............... 428/419, 429, 441, 442, 428/447, 426; 204/159.13, 159.24, 159.23

[56] References Cited

U.S. PATENT DOCUMENTS

| | | | |
|---|---|---|---|
| 3,123,495 | 3/1964 | Carpenter | 428/419 |
| 3,338,810 | 8/1967 | Warner | 428/419 |
| 3,661,744 | 5/1972 | Kehr | 428/419 |
| 3,697,395 | 10/1972 | Kehr | 428/419 |
| 3,697,396 | 10/1972 | Kehr | 428/419 |
| 3,697,402 | 10/1972 | Kehr | 428/419 |
| 3,700,574 | 10/1972 | Kehr | 428/419 |
| 3,717,617 | 2/1973 | Marrs | 428/419 |
| 4,020,218 | 4/1977 | Ranney | 428/429 |
| 4,197,173 | 4/1980 | Curry | 204/159.13 |

*Primary Examiner*—Ellis P. Robinson
*Attorney, Agent, or Firm*—Oblon, Fisher, Spivak, McClelland & Maier

[57] ABSTRACT

A laminated glass product has a bonding layer formed by curing a photocurable composition comprising a polyene, a polythiol and a photocuring rate accelerator, if necessary, an organosilane.

7 Claims, No Drawings

LAMINATED GLASS PRODUCT

BACKGROUND OF THE INVENTION

1. Field of the Invention

The present invention relates to a laminated glass product which is prepared by bonding two or more glass substrates by inserting a photocurable composition comprising a polyene, a polythiol and a photocuring rate accelerator and irradiating it by active rays to cure the composition.

2. Description of the Prior Arts

A laminated glass product has been used for various usages including safety glass plates for car and optical glass products.

Various processes for preparing a laminated glass product have been proposed.

For example, a laminated safety glass plate has been prepared by inserting an organic polymer film between a pair of glass plates and bonding them at an elevated temperature under an elevated pressure. In order to bond uniformly the pair of glass plates without any distortion, a complicated and time-consuming operation has been required.

Polyvinylbutyral film has been usually used as the organic polymer film for a laminated safety glass plate. A polyvinylbutyral film having a thickness of 0.2 to 1.0 mm is treated by an embossing roll and then, it is washed and dried and the film is held between a pair of glass plates and they are bonded at about 100° C. under an elevated pressure to perform a preliminary adhesion and deforming and then, they are heated in an autoclave at 120° to 150° C. under a pressure of 10 to 15 Kg/cm² to perform a final adhesion. A large size apparatus is required for this process, and a long operation time such as 2 hours is required in this process.

It is impossible to combine a process for preparing laminated safety glass plates in a continuous process for producing a glass sheet when said process is employed. Accordingly, a laminated safety glass plate has been used only for special usages. In order to improve the process, various studies have been carried out for preparing laminated safety glass plates by feeding a liquid resin and curing it to bond glass plates.

When a liquid resin such as alkyd resins, polyurethane resins is used, there has been found various disadvantages that a transparency of the cured composition is not satisfactory, a cured composition is brittle at room temperature and the product could not be used as a laminated safety glass plate in commercial.

It has been studied to bond glass plates with a photocurable composition comprising an ethylenically unsaturated compound or an unsaturated polyester as a main component in a photocuring method. However, such photocurable compositions have disadvatages that a curing time is too long; or a contraction is remarkably high in the curing step; or an incomplete curing is caused by oxygen in air; or a coloring is caused by exposing it by ultraviolet rays, and accordingly, it has been difficult to prepare a laminated safety glass plate which can be practically used.

An optical glass product has been prepared by bonding glass substrates with a bonding agent.

The following properties are usually required as a bonding agent for preparing an optical glass product.
(1) colorless and transparent; no absorption nor scatter;
(2) no fluorescent property;
(3) refrative index being similar to that of an optical glass;
(4) high bonding strength which is not changed in aging;
(5) durable to heating, freezing, vibration, oil or solvent;
(6) bonded surface being durable in variation of volume of bonding agent laver in curing or in chemical reaction; and
(7) high processability.

It has been known to use Canada balsam, epoxy resins, polyvinylbutyrals, polyesters and cyanoacrylate resins as a bonding agent for preparing an optical glass product. These bonding agents had certain disadvantage on its processability and its property.

Canada balsam and polyvinylbutyrals are thermoplastic bonding agents whereby a temperature in a usage is limited and a distortion in contraction of the bonding agent layer caused by heating should be eliminated to require a long time for the step.

Epoxy resins are usually used by weighing and mixing with an amine type hardener to have low processability.

Polyester resins have high contraction efficiency in a polymerization whereby a product is affected by moisture in a condition of high temperature and high moisture to peel off from a peripheral part of the product.

Cyano-acrylate type bonding agents have been used, but are not suitable for a wide area.

It has been known that a mixture of a polyene and a polythiol is cured by irradiating ultraviolet rays, in the presence or in the absence of a photocuring rate accelerator (Organic Reaction Vol. 13, page 165-376 (1963)). However, such mixture has not been considered to prepare a laminated glass product.

A photocurable composition comprising an unsaturated compound in a radical polymerization system has been used for preparing a laminated glass product in Japanese Patent Publication No. 30954/1971 and Japanese Unexamined Patent Publication No. 1035/1973. This has disadvantages that an inferrior curing caused in the presence of air and a squeezed part of the composition should be washed out.

SUMMARY OF THE INVENTION

It is an object of the present invention to provide a laminated glass product which has advantageous characteristics .

It is another object of the present invention to provide a process for preparing a laminated glass product having advantageous characteristics by a simple operation.

The foregoing and other objects of the present invention have been attained by providing a laminated glass product which is durable for a long time and which is prepared for a short time by bonding two or more glass substrates with a photocurable composition comprising a polyene, a polythiol and a photocuring rate accelerator under irradiating active rays.

DETAILED DESCRIPTION OF THE PREFERRED EMBODIMENTS

For example, in a preparation of a laminated safety glass plate, a spacer having suitable thickness which has an inlet and an air outlet is inserted between a pair of glass plates and a photocurable composition comprising a polyene, a polythiol and a photocuring rate accelerator is injected from the inlet of the spacer and active rays such as ultraviolet rays are irradiated to the composition for 1 to 30 minutes whereby the injected liquid composition is substantially cured without a contraction to attain the bonding of the glass plates and a laminated safety glass plate can be easily obtained.

It is also possible to prepare the laminated safety glass plate by putting the spacer on one glass plate; pouring the photocurable composition and covering the other glass plate on the spacer and irradiating active rays.

The photocurable composition comprising a polyene and a polythiol as main components, forms sulfide bonds by the curing. It is possible to form a cured composition having elasticity as a rubber by selecting a molar ratio of a polyene to a polythiol and accordingly, a laminated safety glass plate having high shock absorbing property can be obtained by using such composition in said preparation.

It has been found that a processability in a bonding operation for preparing an optical glass product and characteristics of the optical glass product are remarkably improved by using a photocurable composition comprising a polyene and a polythiol and a photocuring rate accelerator in a preparation of a laminated optical glass product.

When a photocurable composition comprising a polyene, a polythiol and a photocuring rate accelerator is used in the process for bonding to prepare a laminated optical glass and curing the composition by irradiating active rays, all conditions required as a bonding agent for an optical glass product are satisfied and it provides remarkable improvements on a processability such as no requirement of a heating for separting bubbles and mixing of a bonding agent and easy control of a time for setting.

The photocurable compositions used for preparing a laminated glass product will be illustrated.

The photocurable composition comprises a polyene and a polythiol and a photocuring rate accelerator as indispensable components and it is rapidly and firmly cured even at room temperature by irradiating active rays.

The polyenes preferably used as one component of the photocurable composition are compounds having the formula (I). The polythiols preferably used as the other component are compounds having the formula (II), (III) or (IV).

Polyenes $$X\left[ Y-\overset{R}{\underset{R}{C}}=C\overset{R}{\underset{R}{\diagup}} \right]_m$$

wherein m is an integer of 2 to 6; R represents a hydrogen atom, a $C_1$-$C_8$ alkyl, a $C_1$-$C_3$ alkoxy or phenyl group which can be substituted with a substituent of nitro or a $C_1$-$C_8$ alkyl or alkoxy group or a halogen atom especially chlorine atom; Y is $+CH_2\frac{}{n}$ (n is 0 or an integer of 1 to 10) $+OCH_2\frac{}{p}$ (p is an integer of 1 to 10); $-O+CH_2\frac{}{q}$ (q is an integer of 1 to 10) or

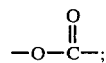

and X is an atom or a group connecting directly to m numbers of Y.

Polythiols

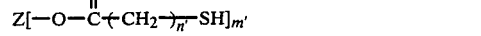
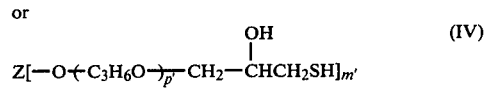

wherein Z is an atom or a group connecting to m' numbers; m' is an integer of 2 to 6; n'and p' are respectively 0 or an integer of 1 to 3. The polythiols preferably compounds having an average molecular weight of 50 to 15,000.

The polyenes having the formula (I) are alkenes having two or more C—C unsaturated bonds in one molecule within the 9th carbon atoms from one end.

The polyenes having the following formula (VI), (VII) and (VIII) are especially preferable.

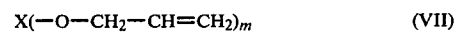
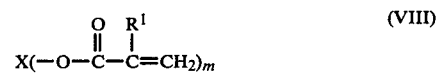

in the formula (VI) to (VIII), X and m are defined in the formula (I) and $R^1$ represents hydrogen atom or a $C_1$-$C_2$ alkyl group.

Suitable polyenes used in the present invention include divinylbenzene, divinyltoluene, ethyleneglycol diacrylate, ethyleneglycol dimethacrylate, diethyleneglycol diacrylate, diethyleneglycol dimethacrylate, triethyleneglycol diacrylate, triethyleneglycol dimethacrylate, trimethylolpropane triacrylate, trimethylolpropane dimethacrylate, trimethylolpropane trimethacrylate, diallyl phthalate, triallyl cyanurate, triallyl isocyanurate, triallyl trimellitate and tetraallyloxy ethane.

The polythiols having the formula (II), (III) and (IV) are compounds having an average molecular weight of 50 to 15,000 and are especially, polythiols having the formula (II), (III) and (IV) wherein Z is

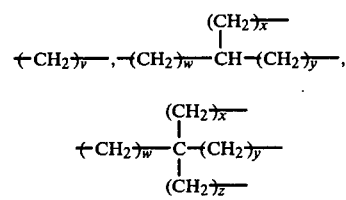

(V is an integer of 1 to 6; and w, x, y and z are respectively 0 or an integer of 1 to 6) or

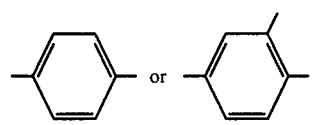

Suitable polythiols include mercapto-containing alkyl compounds such as dimercaptobutane and trimercaptohexane; mercapto-containing aryl compounds such as dimercaptobenzene; polyol esters of thioglycolic acid and thiopropionic acid and a reaction product of hydrogen sulfide and an alkyleneoxide adduct to polyol.

The photocuring rate accelerators are not limited and can be ones used for a photocuring purpose.

Suitable photocuring rate accelerators include benzophenone, p-methoxybenzophenone, acetophenone, m-chloroacetophenone, propiophenone, xanthone, benzoin, benzoin methyl ether, benzoin ethyl ether, benzoin isopropyl ether, benzoin isobutyl ether, benzyl benzaldehyde, naphthoquinone, anthraquinone, 2,4,7,-trinitro-9-fluorenone, 5-nitroacenaphthene, p-nitrodiphenyl, p-nitroaniline and malachite green.

The photocurable composition preferably comprises a polyene ranging 25 to 75 wt. parts and a polythiol ranging 25 to 75 wt. parts and a photocuring rate accelerator ranging 0.1 to 5 wt. parts to 100 wt. parts of a total of the polyene and the polythiol.

The photocurable composition used for preparing a laminated glass product of the present invention comprises indispensable components of a polyene, a polythiol and a photocuring rate accelerator.

When the laminated glass product prepared by curing the photocurable composition comprising these components, is kept in water or in air, there is a possibility to cause gradually a peeling off at the inter-surface of the laminated glass product.

The inventors have found to prevent such peeling-off.

When a photocurable composition comprising the indispensable components of a polyene, a polythiol and a photocuring rate accelerator and an organosilicone having the formula (V) is used as the bonding agent for glass substrates, a laminated glass product which is not peeled off at the inter-surface by aging in water or in air can be obtained.

Organosilicones

wherein $n''$ is 0 or an integer of 1 to 3; X represents chlorine atom or a $C_1$-$C_8$ alkoxy or acetoxy group which can be substituted by chlorine atom, nitro group or a $C_1$-$C_2$ alkoxy group; and Y represents vinyl group which can be substituted by chlorine atom, methoxy, ethoxy, propyloxy or acetoxy group; or acryloyl, methacryloyl, a $C_1$-$C_6$ epoxyalkyl or epoxycycloalkyl, mercaptan, amino or carboxyl group.

Suitable organosilicones (V) include vinylsilane compounds having the formula

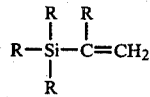

(R is chlorine atom, methoxy, ethoxy, propyloxy or acetoxy group) or

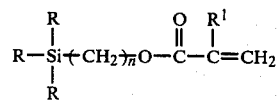

(R is chlorine atom, methoxy, ethoxy, propyloxy or acetoxy group; $R^1$ is hydrogen atom or methyl group; n is 0 or an integer of 1 to 3 and compounds having the formula

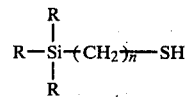

(R is chlorine atom, methoxy, ethoxy, propyloxy or acetoxy group; n is 0 or an integer of 1 to 3.

Suitable organosilicones include vinyltrichlorosilane, vinyltrimethoxysilane, vinyltriethoxysilane, vinyltris (β-methoxyethoxy) silane, γ-methacryloxypropyl trimethoxysilane, vinyl triacetoxysilane and γ-mercaptopropyltrimethoxysilane.

The optimum photocurable composition comprises a polyene having the formula (I) ranging 25 to 75 wt. parts; a polythiol having the formula (II), (III) or (IV) ranging 25 to 75 wt. parts and an organosilane having the formula (V) ranging 0.1 to 10 wt. parts to 100 wt. parts of the total of the polyene and the polythiol and a photocuring rate accelerator ranging 0.1 to 5 wt. parts to 100 wt. parts of the total of the polyene and the polythiol.

The photocurable composition can comprises suitable additive such as antioxidants, curing accelerators, dyes, fillers, pigments, thixotropy forming agents, plasticizers and surfactants.

The photocurable compositions have usually a viscosity ranging about 0.1 to about 1,000 poises at 20° C. and are photosensitive to be easily cured by irradiating active rays such as ultraviolet rays.

The present invention will be further illustrated by certain examples and references which are provided for purposes of illustration only and are not intended to be limiting the present invention.

EXAMPLE 1

A composition shown in Table 1 was poured on a glass plate having a thickness of 4 mm on which a spacer having 0.4 mm was disposed. Another glass plate having the same thickness was put on the composition and the laminated one was irradiated by a 400 W high pressure mercury lamp at a distance of 30 cm for 3 minutes to bond them.

As the result, the resulting laminated safety glass plate had satisfactory characteristics in an appearance test, a projection test, a curve test, an ultraviolet ray exposing test, a boiling test and an impact test defined in Japanese Industrial Standard (JIS) r 3205.

TABLE 1

| Component | Weight parts |
|---|---|
| Diallyl phthalate | 25 |
| N,N-diallylpiperazine | 10 |
| Triallylorthosilicate | 15 |
| Ethyleneglycol dimercaptoacetate | 25 |
| Trimethylolpropane trismercaptoacetate | 25 |
| Methoxybenzoin | 2 |
| Hydroquinone monomethyl ether | 0.02 |

Results of Tests:
Appearance test: normal appearance
Projection test: normal projected straight line image
Curve test: 0.1% curve
Ultraviolet ray exposing test: 5% of reduction of percent transmitance
Boiling test: no change Impact test: only small amount of separated glass pieces; no exposure of inter layer bonding many fine glass pieces covering all surface.

EXAMPLE 2

A composition shown in Table 2 was poured on one glass plate having a thickness of 4 mm on which a spacer having 0.4 mm was disposed. Another glass plate having the same thickness was put on the composition and the laminated one was irradiated by a 400 W high pressure mercury lamp at a distance of 30 cm for 3 minutes to bond them.

As the result, the resulting laminated safety glass plate had satisfactory characteristics in JIS R 3205 as that of Example 1.

TABLE 2

| Component | Weight part |
| --- | --- |
| Triallyl phosphate | 13 |
| Diallyloxalate | 22 |
| 1,5-Hexadiene | 10 |
| Diethyleneglycol dimercaptopropionate | 35 |
| Pentacrythritol tetrakismercaptoacetate | 15 |
| Diethyleneglycol divinyl ether | 5 |
| Benzoin | 2 |
| Dimethylaniline | 0.01 |

EXAMPLE 3

A composition shown in Table 3, was injected between a pair of glass substrates having each diameter of 5 cm and an optical axis was ajusted and the laminated one was irradiated by a 400 W ultraviolet lamp at a distance of 30 cm for 5 minutes to bond them.

As the result, the resulting laminated lens had satisfactory characteristics in an appearance test, an optical axis test, a heat resistance test, a cold resistance test and a thermoshock test The laminated lens was assembled in a spectrophotometer (Model MPS-50L manufactured by Shimazu Seisaku Sho) and spectral percent transmittances were measured. As reference, Canada balsam was used. The result was shown in Table 4.

TABLE 3

| Component | Weight part |
| --- | --- |
| Diallyl terephthalate | 13 |
| Diallyl diphenylphthalate | 27 |
| Tetraallyl methylenediamine | 10 |
| Trimethylolpropane trismercaptopropionate | 20 |
| Ethyleneglycol dimercaptoacetate | 30 |
| Benzoin | 2 |
| Hydroquinone monomethyl ether | 0.01 |

TABLE 4

| Wave length (m) | Percent transmittance (%) | |
| --- | --- | --- |
| | Example 3 | Canada balsam |
| 340 | 96 | 61 |
| 360 | 96 | 78 |
| 380 | 98 | 89 |
| 400 | 98.5 | 93 |
| 420 | 99 | 95 |
| 440 | 99 | 98 |
| 460 | 99 | 98 |
| 480 | 99 | 98 |
| 500 | 99 | 98 |
| 600 | 99 | 98 |
| 700 | 99 | 98 |

EXAMPLE 4

In accordance with the process of Example 3, except using a composition shown in Table 5, a laminated lens was prepared.

As the result, the resulting laminated lens had satisfactory characteristics in an appearance test, an optical axis test, a heat resistance test, a cold resistance test and a thermoshock test.

TABLE 5

| Component | Weight part |
| --- | --- |
| Triallylphosphate | 25 |
| Trimethylolpropane trimethacrylate | 25 |
| Dibutylmethylenebisthioglycolate | 40 |
| Dipentacrythritol hexathiopropionate | 10 |
| Acetophenone | 2 |
| Hydroquinone monomethyl ether | 0.01 |

The tests of the laminated lens were carried out as follows.

(1) Appearance test:
 (a) A dust on a bonding surface is observed.
 (b) After bonding, an interference fringe formed by cracking in a bonding layer caused by a shock or vibration is observed.

(2) Optical axis test:
Optical axis of a pair of glass substrates must be adjusted in a bonding and eccentricity is examined by a special microscope.

(3) Heat resistance test:
A laminated lens is held in a constant temperature oven under 30 to 45 degree of slant of a bonding surface of the lens at 60° C. for 30 minutes and an optical accuracy (deviation of optical axis) of the lens is tested and then, the lens is cooled to room temperature and the test is repeated again.

(4) Cold resistance test:
A laminated lens is kept in a cold chamber at −30° C. for 30 minutes to 1 hour and crackings of a bonding layer is observed.

(5) Vibration test:
A laminated lens is held on a vibrating machine and is vibrated in horizontal direction and in vertical direction at maximum speed of 10 to 300 cm/sec. in 10 G and at 300 to 500 cm/sec. in 8 G and a change of a bonding layer is observed.

(6) Termal shock test:
A laminated lens is kept in a Tenney Thermal Shock Chamber (Model TM-TS-85350) and a thermal shock is applied at +70° C. to −70° C. and a bonding layer is observed.

In all of the tests, no abnormal change should be found.

EXAMPLE 5

| | |
| --- | --- |
| Diethyleneglycol dimethacrylate | 20 wt. parts |
| Trimethylolpropane trimethacrylate | 30 wt. parts |
| Trimethylolpropane trismercaptopropionate | 50 wt. parts |
| Benzophenone | 1 wt. parts |

The components were mixed to obtain a homogeneous mixed liquid. The mixed liquid was divided into two portions (Composition (A): no addiion). One was admixed with 1 wt.% of vinyltris-β-methoxyethoxysilane (A-172 manufactured by Union Carbide Co.) to form Composition (B).

Each of Composition (A) and Composition (B) was injected between a pair of crown glass plates having a size of 0.6 mm×25 mm×25 mm and each laminated one was irradiated by a 400 W ultraviolet lamp at a distance of 20 cm for 1 minute. In both cases (A and B), the pair of glass plates were firmly bonded. The laminated glass plates (A and B) were kept in a chamber at 80° C. and 100% of a relative humidity and the laminated glass plates were observed in aging. The results are as follows.

| Aging | A | B |
| --- | --- | --- |
| After 24 hours | no change | no change |
| After 48 hours | slightly peeling at edge | " |
| After 72 hours | completely peeling | " |
| After 100 hours | " | " |
| After 200 hours | " | " |

EXAMPLE 6

| | |
| --- | --- |
| Trimethylolpropane triacrylate | 20 wt. parts |
| Epoxyacrylate(manufactured by Showa Kobunshi K.K.) | 10 wt. parts |
| Triallylisocyanurate | 20 wt. parts |
| 1,4-Butanediol dimercaptoacetate | 40 wt. parts |
| Benzophenone | 1 wt. parts |

In accordance with the process of Example 5, the above-mentioned components were mixed to form a homogeneous mixed Composition (C) and 1 wt. part of γ-mercaptopropyl trimethoxysilane (A-189 manufactured by Union Carbide Co.) was admixed with one portion of a homogeneous mixed composition to form Composition (D), and a pair of flint glass plates were bonded with each Composition (C) or (D) and the laminated glass plates were kept in a chamber at 80° C. and 100% of a relative humidity and the laminated glass plates were observed in aging. The results are as follows.

| Aging | C | D |
| --- | --- | --- |
| After 24 hours | no change | no change |
| After 48 hours | completely peeling | " |
| After 72 hours | " | " |
| After 100 hours | " | " |
| After 200 hours | " | " |

EXAMPLE 7

| | |
| --- | --- |
| Divinylstyrene | 50 wt. parts |
| Trimethylolpropane tris-mercaptoacetate | 100 wt. parts |
| Benzophenone | 1 wt. parts |

In accordance with the process of Example 5, the above-mentioned components were mixed to form a homogeneous mixed Composition (E) and 1 wt. part of γ-methacryloxypropyltris (β-methoxyethoxy) silane (A-175 manufactured by Union Carbide Co.) was admixed with one portion of a homogeneous mixed composition to form Composition (F) and a pair of flint glass plates were bonded with each Composition (E) or (F) and the laminated glass plates were kept in a chamber at 80° C. and 100% of a relative humidity and the laminated glass plates were observed in aging. The results are as follows.

| Aging | E | F |
| --- | --- | --- |
| After 24 hours | no change | no change |
| After 48 hours | slightly peeling at edge | " |
| After 72 hours | completely peeling | " |
| After 100 hours | " | " |
| After 200 hours | " | " |

EXAMPLE 8

The laminated glass plates prepared in Examples 5, 6 and 7 were kept in outdoor and changes of them were observed in aging. The results are shown in Table 6.

TABLE 6

| Aging | A | B | C | D | E | F |
| --- | --- | --- | --- | --- | --- | --- |
| After 7 days | no cha. | no cha. | Sl. peel | no cha. | Sl. peel | no cha. |
| After 30 days | Sl. peel | " | E dg. peel | " | Edg. peel | " |
| After 60 days | Edg. peel | " | Comp. peel | " | Comp. peel | " |
| After 100 days | Comp. peel | " | " | " | " | " |
| After 200 days | " | " | " | " | " | " |
| After 500 days | " | " | " | " | " | " |
| After 1000 days | " | " | " | " | " | " | no. cha.: no change
Sl. peel: slightly peeling at edge
Edg. peel: peeling at edge
Comp. peel: completely peeling

EXAMPLES 9

Each of the compositions prepared in Examples 5, 6 and 7 was coated on a quartz plate having a size of 10 mm×50 mm×1 mm in a thickness of about 30 mµ, and it was irradiated by a 100 W mercury lamp at a distance of 25 cm for 30 minutes and spectral percent transmittances of each sample were measured by a spectrophotometer (Model MPS-50L manufactured by Shimazu Seisakusho). The results are shown in Table 7. Any reduction of percent transmittance was not observed by an incorporation of the organosilane compound.

TABLE 7

| Wave length (mµ) | Percent transmittance (%) composition | | | | | |
| --- | --- | --- | --- | --- | --- | --- |
| | A | B | C | D | E | F |
| 340 | 98.0 | 98.0 | 97.5 | 97.5 | 98.0 | 98.0 |
| 380 | 98.0 | 98.5 | 98.5 | 97.5 | 98.0 | 98.5 |
| 420 | 99.0 | 99.0 | 98.0 | 98.5 | 99.0 | 99.0 |
| 460 | 99.0 | 99.0 | 99.0 | 99.0 | 99.0 | 99.0 |
| 500 | 99.0 | 99.0 | 99.0 | 99.0 | 99.0 | 99.0 |
| 600 | 99.0 | 99.0 | 99.0 | 99.0 | 99.0 | 99.0 |
| 700 | 99.0 | 99.0 | 99.0 | 99.0 | 99.0 | 99.0 |

What is claimed is:

1. A laminated glass product having a bonding layer formed by curing a photocurable composition comprising a polyene component, a polythiol component, an organosilicone compound and a photocuring rate accelerator; wherein (A) said polyene is a compound having the formula

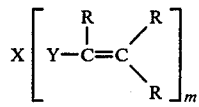

wherein m is an integer of 2 to 6; R represents a hydrogen atom, a $C_1$-$C_8$ alkyl, a $C_1$-$C_3$ alkoxy or phenyl group which can be substituted with a substituent of nitro, $C_1$-$C_8$ alkyl or alkoxy group or a halogen atom; Y is $-(CH_2)_n-$ wherein n is 0 or an integer of 1 to 10, $-(OCH_2)_p-$ wherein p is an integer of 1 to 10, $-O-(CH_2)_q-$ wherein q is an integer of 1 to 10 or

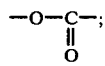

and X is a polyvalent group which has a valency of m representing benzene, toluene, ethylene glycol, diethylene glycol, triethylene glycol, trimethylolpropane, phthalate, cyanurate, isocyanurate, trimellitate, ethane, N,N-piperazine, orthosilicate, phosphate, oxalate, terephthalate, diphenylterephthalate or methylenediamine group;

(B) said polythiol is a compound having the formula $$Z(-SH)_{m'} \quad (II)$$

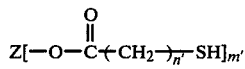

or

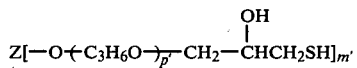

wherein Z is a group connecting m' members and is $-(CH_2)_v-$

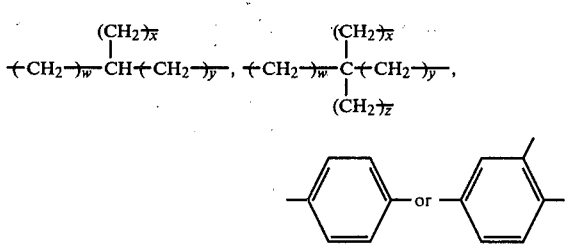

wherein v is an integer of 1 to 6, and w, x, y and z are respectively 0 or an integer of 2 to 6; m' is an integer of 2 to 4; n' and p' are respectively 0 or an integer of 1 to 3; said polythiol having an average molecular weight of 50 to 15,000;

(C) said organosilicone compound is a compound having the formula

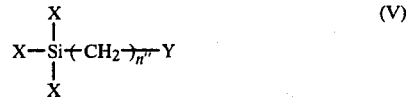

wherein n" is 0 or an integer of 1 to 3; X represents chlorine atom or a $C_1$-$C_8$ alkoxy or acetoxy group which can be substituted by chlorine atom, nitro group or a $C_1$-$C_2$ alkoxy group; and Y represents vinyl group which can be substituted by chlorine atom, methoxy, ethoxy, propyloxy or acetoxy; or acryloyl, methacryloyl or mercaptan group; and (D) said photocuring rate accelerator is selected from the group consisting of benzophenone, p-methoxybenzophenone, acetophenone, m-chloroacetophenone, propiophenone, xanthone, benzoin, benzoin methyl ether, benzoin ethyl ether, benzoin isopropyl ether, benzoin isobutyl ether, benzyl benzaldehyde, naphthoquinone, anthraquinone, 2,4,7-trinitro-9-fluorenone, 5-nitro-acenaphthene, p-nitrodiphenyl, p-nitroaniline and malachite green.

2. The laminated glass product according to claim 1, which is a laminated safety glass plate.

3. The laminated glass product according to claim 1, which is a laminated optical glass product.

4. The laminated glass product according to claim 1, wherein said photocurable composition comprises: from 25 to 75 wt. parts of said polyene; from 25 to 75 wt. parts of said polythiol; from 0.1 to 10 wt. parts of said organosilicone compound per 100 wt. parts of the total of said polyene and said polythiol; and from 0.1 to 5 wt. parts of said photocuring rate accelerator per 100 wt. parts of the total of said polyene and said polythiol.

5. A photocurable composition which comprises a polyene component, a polythiol component, an organosilicone compound and a photocuring rate accelerator wherein said polyene is a compound having the formula

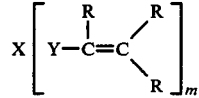

wherein m is an integer of 2 to 6; R represents a hydrogen atom, a $C_1$-$C_8$ alkyl, a $C_1$-$C_3$ alkoxy or phenyl group which can be substituted with a substituent of nitro, $C_1$-$C_8$ alkyl or alkoxy group or a halogen atom; Y is $-CH_2)_n$ wherein n is 0 or an integer of 1 to 10, $-CH_2)_p$ wherein p is an integer of 1 to 10, $-CH_2)_q$ wherein q is an integer of 1 to 10 or

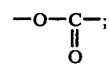

and X is a polyvalent group which has a valency of m representing benzene, toluene, ethylene glycol, diethylene glycol, triethylene glycol, trimethylolpropane, phthalate, cyanurate, isocyanurate, trimellitate, ethane, N,N-piperazine, orthosilicate, phosphate, oxalate, terephthalate, diphenylterephthalate or methylenediamine group;

said polythiol is a compound having the formula $$Z(-SH)_{m'} \quad (II)$$

-continued

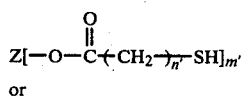 (III)

or

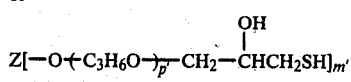 (IV)

wherein Z is a group connecting m' members and is —CH$_2$)$_v$,

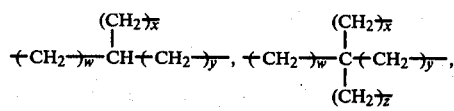

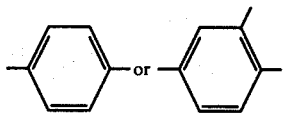

wherein v is an integer of 1 to 6, and w, x, y and z are respectively 0 or an integer of 2 to 6; m' is an integer of 2 to 4; n' and p' are respectively 0 or an integer of 1 to 3; said polythiol having an average molecular weight of 50 to 15,000; and said organosilicone compound is a compound having the formula

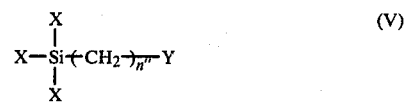 (V)

wherein n'' is 0 or an integer of 1 to 3; X represents chlorine atom or a $C_1$–$C_8$ alkoxy or acetoxy group which can be substituted by chlorine atom, nitro group or a $C_1$–$C_2$ alkoxy group; and Y represents vinyl group which can be substituted by chlorine atom, methoxy, ethoxy, propyloxy or acetoxy group; or acryloyl, methacryloyl or mercaptan group.

6. A photocurable composition according to claim 5 which comprises from 25 to 75 wt. parts of said polyene; from 25 to 75 wt. parts of said polythiol; from 0.1 to 10 wt. parts of said organosilicone compound per 100 wt. parts of the total of said polyene and said polythiol; and from 0.1 to 5 wt. parts of said photocuring rate accelerator per 100 wt. parts of the total of said polyene and said polythiol.

7. A photocurable composition according to claim 6 wherein said photocuring rate accelerator is selected from the group consisting of benzophenone, p-methoxybenzophenone, acetophenone, m-chloroacetophenone, propiophenone, xanthone, benzoin, benzoin methyl ether, benzoin ethyl ether, benzoin isopropyl ether, benzoin isobutyl ether, benzyl benzaldehyde, naphthoquinone, anthraquinone, 2,4,7-trinitro-9-fluorenone, 5-nitroacenaphthene, p-nitrodiphenyl, p-nitroaniline and malachite green.

* * * * *